May 29, 1923.
W. A. PAUL
CULTIVATOR
Filed Oct. 26, 1915   3 Sheets-Sheet 2
1,456,566
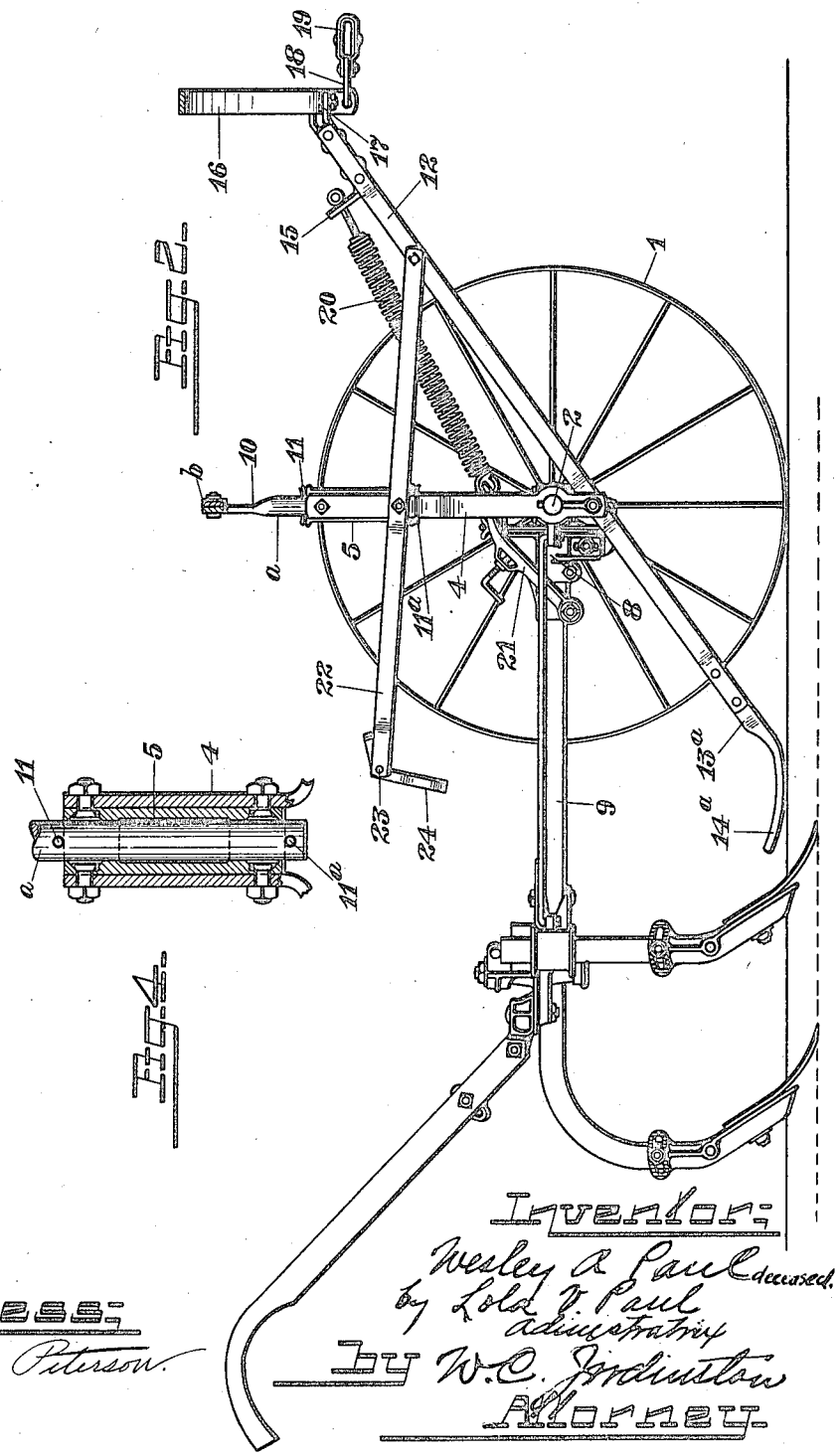

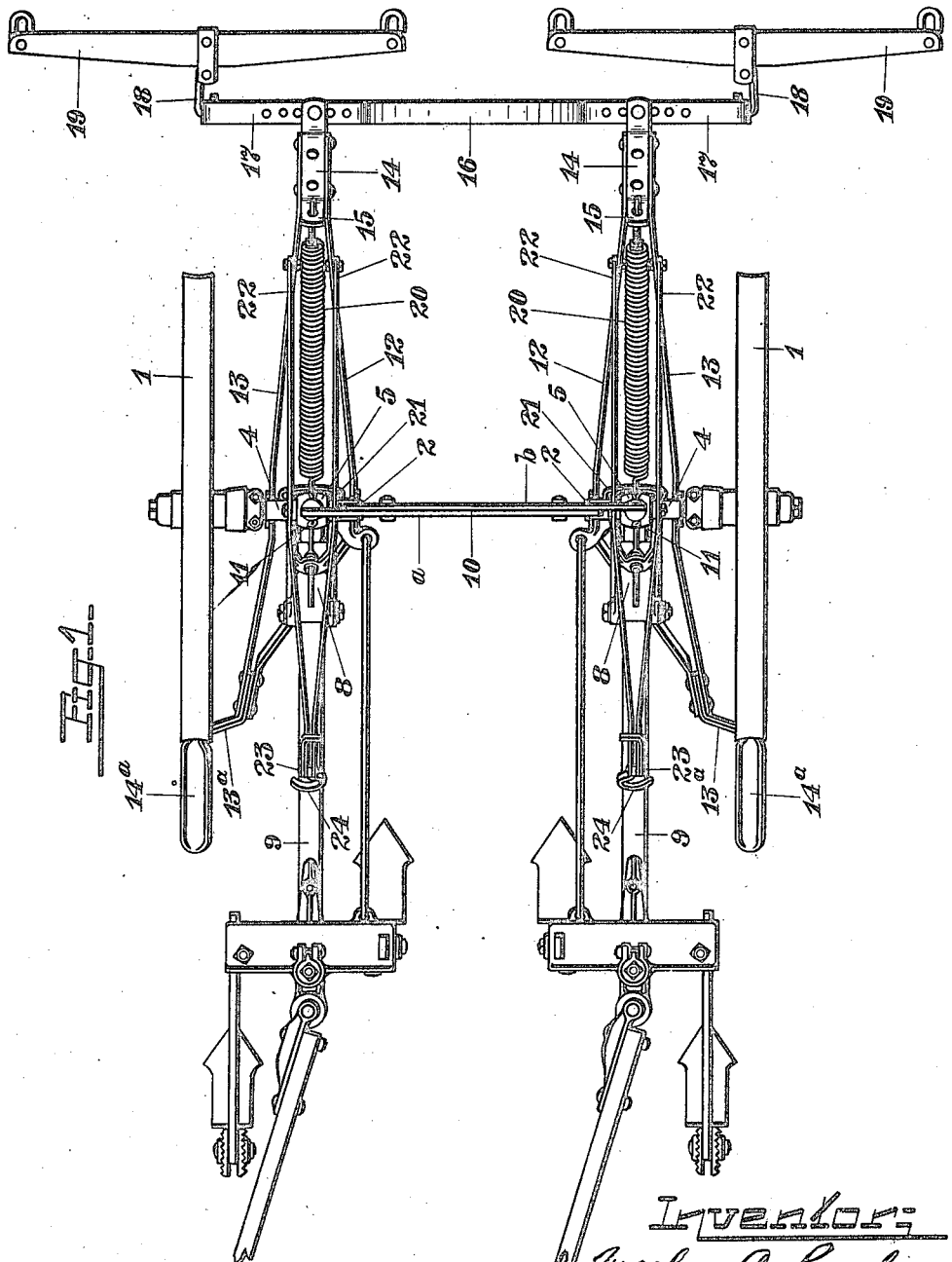

May 29, 1923.
W. A. PAUL
CULTIVATOR
Filed Oct. 26, 1915  3 Sheets-Sheet 3
1,456,566
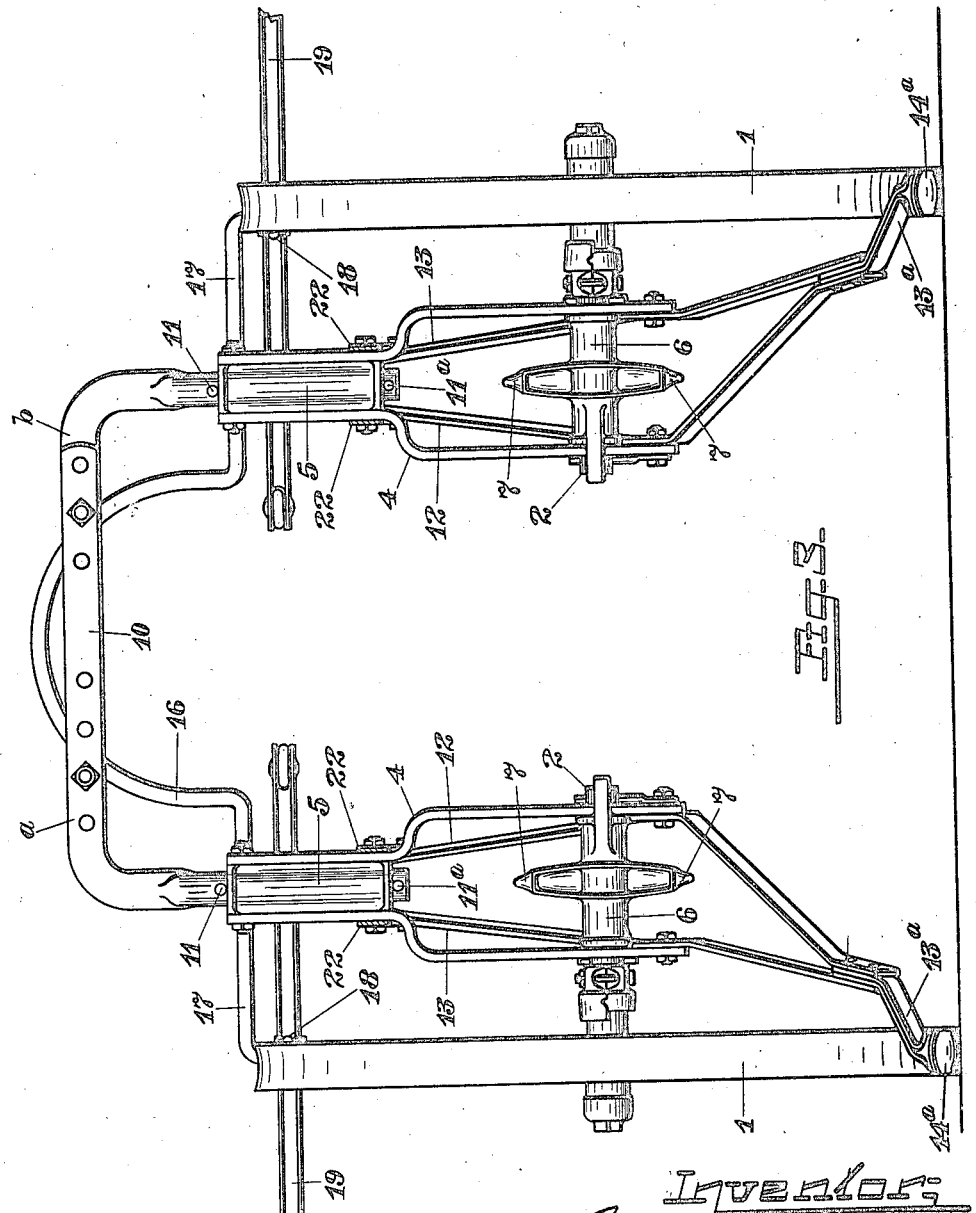

Patented May 29, 1923.

1,456,566

UNITED STATES PATENT OFFICE.

WESLEY A. PAUL, DECEASED, LATE OF MOLINE, ILLINOIS, BY LOLA V. PAUL, ADMINISTRATRIX, OF MOLINE, ILLINOIS, ASSIGNOR TO DEERE & COMPANY, OF MOLINE, ILLINOIS, A CORPORATION OF ILLINOIS.

CULTIVATOR.

Application filed October 26, 1915. Serial No. 57,930.

*To all whom it may concern:*

Be it known that WESLEY A. PAUL, deceased, late a citizen of the United States, and a resident of Moline, in the county of Rock Island and State of Illinois, did invent certain new and useful Improvements in Cultivators, of which the following is a specification, reference being had therein to the accompanying drawing.

My invention relates to new and useful improvements in cultivators particularly to that class known as tongueless cultivators employed in the cultivation of corn or similar crops.

In varying conditions of the ground in different fields, and to accommodate the cultivator to differing widths between rows or growing vegetation it is necessary to provide for lateral adjustment of the gangs of cultivating devices so as to stir the earth as near to the plants as may be desired without changing the draft or varying the width between the horses, and at the same time preserve a parallel relation of the wheels with each other; these desirable features are embodied in my improvements as hereinafter fully described.

Figure 1 is a plan view of a tongueless cultivator embodying my improvements.

Figure 2 is a longitudinal vertical section through the center of the cultivator.

Figure 3 is a rear elevation with the cultivating gangs removed, and

Figure 4 is a detail.

Supporting wheels 1 are mounted to rotate on stub axles 2 supported on the stub axles 2 are yokes 4 to the upper ends of which are secured sleeves 5. Between the arms of the yokes 4 and on the stub axles 3 are sleeves 6 having vertical projections 7, which form pivotal supports for coupling members 8, of well known type, which are mounted on the forward ends of beams 9 on which are carried earth treating implements of a desired form; in the drawings I have shown shovels but other devices such as disks or the like may be employed.

A main arch 10 has its ends supported in the sleeves 5 so as to be free to oscillate therein but held against vertical movement by pins or cotters 11 above the sleeves 5 and similar pins or cotters $11^a$ below said sleeves. The main arch 10 is composed of two members $a$ and $b$ having their upper portions overlapping and secured together by suitable bolts; a series of perforations is provided in the members $a$ and $b$ so that the arch 10 can be made wider if desired, or contracted by removing the bolts, which hold the members $a$ and $b$ together, and laterally moving the members until the desired adjustment as to width has been obtained, when the said arch members $a$ and $b$ can be again secured together.

Extending forwardly and upwardly from the lower ends of the arms of the yokes 4, to which they are secured, parallel pairs of draft bars 12 and 13, each pair converging at their forward ends and rigidly secured by bolts or rivets to a member 14 the rear end of which is bent upward to form a standard 15, the forward end being bifurcated for the reception of a draft arch 16; the draft arch 16 has horizontal portions 17 which are secured pivotally in the bifurcated ends of the members 14, and extending therebeyond, the extremity of the horizontal portions 17 being preferably bent downward and having perforations for hooks 18 to which are attached singletrees 19. The draft bars 12 and 13 are extended rearwardly and, as shown more clearly in Figure 3, are bent toward the wheels 1 and converge to shanks $13^a$ to which they are riveted or otherwise secured; the shanks $13^a$ are preferably integral with shoes $14^a$ adapted to slide over the ground. Coiled springs 20 are connected to the standards 15 and extend rearwardly to connection with the forward ends of members 21 pivotally mounted on the coupling members 8 rearward of the stub axles 3; the tension of the coiled springs 20 not only holding up the draft bars 12 and 13 but aiding materially in raising the gangs from the ground, suitable handles being secured to the gang beams for that purpose and to guide the gangs when operating in the ground.

Bars 22 are secured to the draft bars 12 and 13, intermediate the ends of the latter, and extend rearwardly on opposite sides of the upper ends of the yokes 4 to which they are secured; the rearward ends of the bars 22 are brought together by bolts 23 on which are suspended, between the bars 22, hooks 24 which are utilized to support the gang beams 9 when they are raised.

As before explained the parts $a$ and $b$ of the main arch 10 can be adjusted to increase or decrease the width between the gangs of cultivating devices, and as it is desirable, in order to produce the best results in the operation of the cultivator, to have the draft in line with the pivots of the gangs, the latter being in vertical alinement with the oscillatory ends of the main arch 10, the draft bars 12 and 13 must be capable of lateral adjustment; I provide for lateral adjustment of the draft bars 12 and 13 by having a series of perforations in the horizontal portions of the arch 16, so that after the main arch 10 is adjusted the forward ends of the draft bars 12 and 13 can also be adjusted by removing the bolts which hold them pivotally in place on the horizontal portions of the arch 16 and moving the draft bars 12 and 13 to a position corresponding to the adjustment of the arch 10. The position of the horses in drawing the cultivator is constant, the gangs and draft bars 12 and 13 only being changeable laterally, the gangs of cultivating devices being spread apart or drawn closer together by lateral adjustment of the parts *a* and *b* of the main arch 10 and the draft bars being adjustable laterally on the arch 16 as heretofore explained.

It will be readily understood that as the main arch 10 is pivotally supported in the sleeves 5, and the draft bars 12 and 13 are pivotally connected to the draft arch 16 and both arches being in parallel relation, in the event that one horse should move in advance of the other both arches would be at an angle to the line of draft, but the wheels and gangs of cultivating devices would still be parallel to the line of work.

It is also apparent that, the arches 10 and 16 being parallel with each other and connected together by the draft bars 12 and 13, a forward or rearward movement of either end of the arch 16 will simultaneously move the corresponding end of the main arch 10; consequently the stub axles 2 are moved forward or backward in a horizontal plane, and the gangs of cultivating devices operate at the same depth; if the arch 10 was not adjustable with the arch 16 and the latter was alone capable of swinging horizontally the vertical portions of the main arch 10 would of necessity have to swing forward or backward influencing the depth of operation of the cultivating devices to a greater or less degree.

What I claim is—

1. In a cultivator, the combination of wheeled axles adapted to independent movement forwardly or backwardly in parallel relation to the line of work, cultivating devices pivotally connected to each axle, a main arch connecting said axles and supported thereon by vertical pivots, a draft arch in constant parallel relation to the main arch, means to connect each axle with the draft arch, said connection and the pivotal connections of the cultivating devices and the main arch being in the same longitudinal vertical plane, and a draft device on each end of the draft arch.

2. In a cultivator, the combination of wheeled axles adapted to independent movement forwardly or backwardly in parallel relation to the line of work, cultivating devices pivotally connected to each axle, a main arch connecting said axles and supported thereon by vertical pivots, a draft arch in constant parallel relation with the main arch, means to connect each axle with the draft arch, said connection and the pivotal connection of the cultivating devices and the main arch being in the same longitudinal vertical plane, means to laterally adjust the main arch and the means connecting the axles with the draft arch to vary the distance of one gang of cultivating devices from the other, and a draft device on each end of the draft arch.

3. In a cultivator, the combination of wheeled axles adapted to independent movement forwardly or backwardly in parallel relation to the line of work, cultivating devices pivotally connected to each axle, a main arch connecting said axles and, comprising dual members pivotally supported on each axle respectively, said members being laterally adjustable, a draft arch in constant parallel relation with the main arch, draft bars connected with the axles and pivotally connected to the draft arch in line with the pivotal supports of the main arch and the vertical pivot of the cultivating devices, and draft devices having fixed connections with the ends of the draft arch.

4. In a cultivator the combination of wheeled axles adapted to independent movement forwardly or backwardly in parallel relation to the line of work, cultivating devices pivotally connected to each axle, a main arch connecting said axles and supported thereon by vertical pivots, said arch comprising dual members secured together and adjustable to vary the width of the arch, a draft arch in constant parallel relation with the main arch, draft bars connected with the axles and pivotally connected to the draft arch in line with the pivoted supports of the main arch and the cultivating devices, means to adjust said draft bars laterally when the main arch is adjusted, and draft devices having a fixed connection with the ends of the draft arch.

5. In a cultivator, the combination of wheeled axles adapted to independent movement forwardly or backwardly in parallel relation to the line of work, cultivating devices pivotally connected to each axle, yokes supported on the axles and having vertical sleeves rigidly secured at their upper ends, a main arch having vertical portions pivotally supported in said sleeves, a draft arch forward of the main arch and in constant parallel relation therewith, draft bars connecting the draft arch and the axles and pivotally connected to the draft arch, said pivotal connection and the pivotal connections of the cultivating devices and the main arch being in the same longitudinal vertical plane, and draft devices having fixed connections with the ends of the draft arch.

In testimony whereof I affix my signature, in presence of two witnesses.

LOLA V. PAUL,
*Administratrix of Wesley A. Paul, deceased.*

Witnesses:
JESSIE SIMSER,
W. G. DUFFIELD.